(12) United States Patent
Podgorny et al.

(10) Patent No.: US 11,423,314 B2
(45) Date of Patent: Aug. 23, 2022

(54) METHOD AND SYSTEM FOR FACILITATING USER SUPPORT USING MULTIMODAL INFORMATION

(71) Applicant: Intuit Inc., Mountain View, CA (US)

(72) Inventors: Igor A. Podgorny, San Diego, CA (US); Sparsh Gupta, San Diego, CA (US); Vitor R. Carvalho, San Diego, CA (US); Michael R. Cowgill, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 485 days.

(21) Appl. No.: 16/669,437

(22) Filed: Oct. 30, 2019

(65) Prior Publication Data

US 2021/0133581 A1 May 6, 2021

(51) Int. Cl.
| | |
|---|---|
| *G06N 3/08* | (2006.01) |
| *G06N 3/04* | (2006.01) |
| *G10L 15/183* | (2013.01) |
| *G10L 15/04* | (2013.01) |
| *G10L 15/16* | (2006.01) |
| *G10L 15/22* | (2006.01) |

(52) U.S. Cl.
CPC ........... *G06N 3/084* (2013.01); *G06N 3/0445* (2013.01); *G06N 3/0454* (2013.01); *G10L 15/04* (2013.01); *G10L 15/16* (2013.01); *G10L 15/183* (2013.01); *G10L 15/22* (2013.01); *G10L 2015/223* (2013.01)

(58) Field of Classification Search
CPC .... G06N 3/084; G06N 3/0445; G06N 3/0454; G10L 15/04; G10L 15/16; G10L 15/183; G10L 15/22; G10L 2015/223; G10L 15/26; G06F 40/35; G06Q 30/016
See application file for complete search history.

(56) References Cited

U.S. PATENT DOCUMENTS

| | | | |
|---|---|---|---|
| 2018/0012598 A1* | 1/2018 | Thirukovalluru | ....... G10L 15/26 |
| 2019/0188295 A1* | 6/2019 | Sirotkovic | ........... G06N 3/0454 |
| 2021/0065702 A1* | 3/2021 | Fink | ......................... G06N 3/08 |
| 2021/0126881 A1* | 4/2021 | Ball | ...................... G06F 40/284 |

* cited by examiner

*Primary Examiner* — Daniel C Washburn
*Assistant Examiner* — Athar N Pasha
(74) *Attorney, Agent, or Firm* — Ferguson Braswell Fraser Kubasta PC

(57) ABSTRACT

A method for facilitating user support using multimodal information involves obtaining an interaction between a user and a support agent, generating a question embedding from the interaction, obtaining a clickstream associated with the interaction, and generating a clickstream embedding from the clickstream. The question embedding and the clickstream embedding form a shared latent space representation. The method further involves decoding a problem summary from the shared latent space representation and providing the problem summary to the support agent.

20 Claims, 8 Drawing Sheets

METHOD AND SYSTEM FOR FACILITATING USER SUPPORT USING MULTIMODAL INFORMATION

BACKGROUND

Software applications have reached a high level of functionality and complexity causing users to contact support agents for help when a question or problem is encountered. Frequently, the users have difficulty expressing the nature of the problem that being faced. In some cases, users may not even understand the problem being encountered and may, therefore, be unable to describe it. As a result, support agents may spend significant time to fully understand the problem about which the user is calling. Further, at least some of the problems that users encounter may be repetitive, i.e., multiple users may experience the same or a similar problem. Reducing the average handle time (AHT) associated with resolving these problems by the support agents may help reduce expenses for providing user support and improve the overall support process.

SUMMARY

In general, in one aspect, one or more embodiments relate to a method for facilitating user support using multimodal information. The method includes obtaining an interaction between a user and a support agent, generating a question embedding from the interaction, obtaining a clickstream associated with the interaction, and generating a clickstream embedding from the clickstream. The question embedding and the clickstream embedding form a shared latent space representation. The method further includes decoding a problem summary from the shared latent space representation and providing the problem summary to the support agent.

In general, in one aspect, one or more embodiments relate to a system for facilitating user support using multimodal information. The system includes a computer processor, and a problem decoder executing on the computer processor. The problem decoder is further configured to obtain an interaction between a user and a support agent, generate, by a user input encoder, a question embedding from the interaction, obtain a clickstream associated with the interaction, generate, by a clickstream encoder, a clickstream embedding from the clickstream. The question embedding and the clickstream embedding form a shared latent space representation. The problem decoder is further configured to decode, by a shared latent space decoder, a problem summary from the shared latent space representation, and provide the problem summary to the support agent.

In general, in one aspect, one or more embodiments relate to a non-transitory computer readable medium including computer readable program code for causing a computer system to obtain an interaction between a user and a support agent, generate a question embedding from the interaction, obtain a clickstream associated with the interaction, and generate a clickstream embedding from the clickstream. The question embedding and the clickstream embedding form a shared latent space representation. The computer readable medium further causes the computer system to decode a problem summary from the shared latent space representation, and provide the problem summary to the support agent.

Other aspects of the invention will be apparent from the following description and the appended claims.

DETAILED DESCRIPTION

Figure 1:
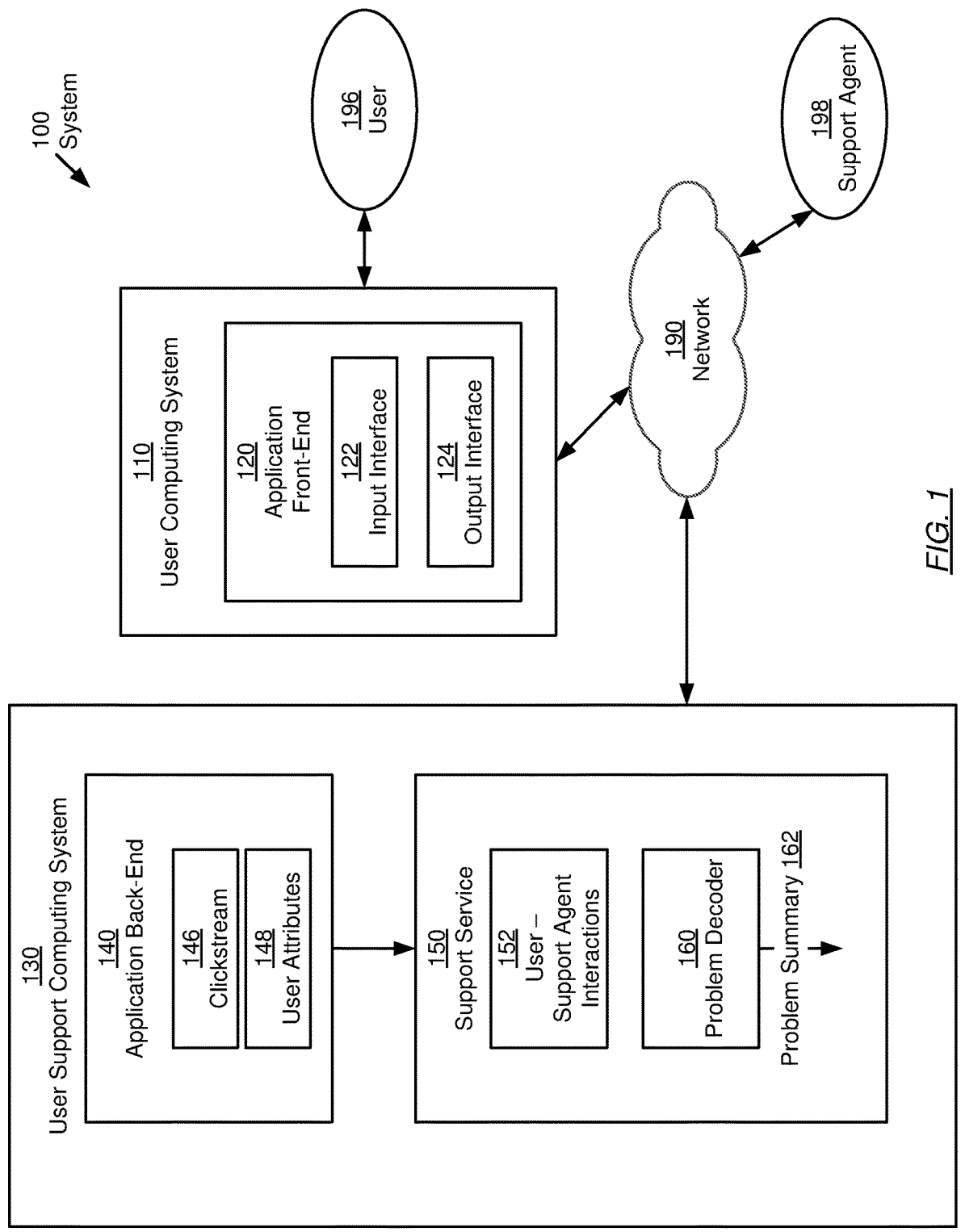
FIG. 1 shows a system for facilitating user support using multimodal information in accordance with one or more embodiments of the disclosure.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the disclosure, the various disclosed embodiments may be combined in virtually any manner. All combinations are contemplated herein.

In general, embodiments of the disclosure provide methods and systems for facilitating user support using multimodal information. Frequently, it is difficult for users to express the nature of a problem being encountered while using software applications. Accordingly, when contacting a support agent (e.g., by calling a technical support specialist, initiating a tech-support chat session, etc.), the support agent may spend significant time to gain an understanding of the user's problem based on the user's description. Sometimes, the user's description may be incoherent, may barely touch the problem, may use improper terminology, and/or may be outright misleading. Embodiments of the disclosure, as described herein, process an interaction between the user and the support agent (e.g., a telephone, email, or chat conversation) to identify the problem experienced by the user.

The interaction may include, for example, the user's attempt to describe the problem, and may further include questions asked by the support agent, proposed solutions, etc. In one or more embodiments, a problem summary reflecting the user's actual problem is obtained based on an analysis of not only the interaction between the user and the support agent, but also based on a clickstream gathered while the user was interacting with the software application at the time of encountering the problem. In addition, user attributes may also be considered. The problem summary may reflect the user's actual problem with reasonable accuracy, even when the user himself is unable to properly describe the actual problem.

Embodiments of the disclosure may enable the generation of the problem summary in real time. A suggested solution may also be provided by matching the problem summary to that of a closest previously solved case.

The following discussion first introduces a system for facilitating user support using multimodal information, followed by one or more methods for facilitating user support using multimodal information. Subsequently, one or more methods for updating the system based on previously handled interactions between users and support agents are provided.

Turning to FIG. 1, a system (100), in accordance with one or more embodiments of the disclosure, is shown. On a high level, the system (100) employs natural language processing to generate dynamic agent notes in the form of a problem summary (162). The problem summary (162) may be generated in real-time, as a support agent (198) is interacting with a user (196). The generation of a problem summary may be performed in real-time, as the support agent (198) and the user (196) are interacting, e.g., in a conversation.

Embodiments of the disclosure are based on a generative model approach that produces problem summaries (162) based on machine translation techniques. In one or more embodiments, the translation is performed from a multi-modal input (including a clickstream modality and a text input modality, e.g., the interaction between the user and the support agent) to a text output (in the form of a problem summary). The text output is in the same language as the text input modality, whereas the clickstream modality uses an entirely different format, although still providing potentially overlapping information. In one or more embodiments, by understanding and deep learning from the user's clickstream, the problem that the user is encountering may be inferred more accurately in comparison to a decoding from the interaction between user and support agent alone.

The system (100) may include a user computing system (110), a user support computing system (130), and a network (190). The combination of the user computing system (110) and the user support computing system (130) may execute one or more software applications (not shown). A user (196) may interact with the user computing system (110) to access the software application. The user (196) may further interact with the support agent (198) when asking for assistance. Each of these components is subsequently described.

The user computing system (110) may enable a user to access the one or more software applications via an application front-end (120). The software application may provide one or more functionalities to support, for example, accounting tasks, tax calculation tasks, administrative tasks, multimedia tasks, social network tasks, etc. The software application may perform any task that involves some degree of interaction with a user. The computing device (110) may be a portable or a non-portable device such as a desktop personal computer, a laptop, a tablet computer, a smartphone etc. An example of a computing system, in accordance with one or more embodiments, is provided in FIG. 8A and FIG. 8B. Any number of user computing systems (110) may be part of the system (100).

In one or more embodiments, the user computing system (110) hosts the application front-end (120). The application front-end (120) may provide a user interface enabling the user to access functionality provided by the software application. While some, most, or all functionality of the software application may be implemented by the application back-end (140) on the user support computing system (130), the application front-end (120), in accordance with one or more embodiments, makes the functionality accessible to the user. The application front-end may, thus include graphical or other user interfaces. The application front-end (120) may be a standalone executable application or a browser-hosted application, a smartphone or tablet app, or any other application capable of providing an interface to the application back-end (140). The application front-end (120) may provide the user with one or more input interfaces (122). An input interface may be for spoken and/or typed language. Other input interfaces may be provided in the form of dialog boxes, check boxes, etc. The application front-end (120) may further provide the user with output interfaces (124) such as text boxes, charts, graphs, animations, etc. Those skilled in the art will appreciate that the configuration of the application front-end (120) may depend on the purpose and/or configuration of the software application and may vary without departing from the disclosure.

Continuing with the discussion of FIG. 1, the user support computing system (130) may be a computing system such as the computing system described with reference to FIG. 8A and FIG. 8B. The user support computing system (130) may include one or more local servers or may be cloud based.

In one or more embodiment, the user support computing system (130) provides an application back-end (140) for the one or more software applications that are being accessed by user via the application front-end (120) on the user computing system (110). As previously noted, the software applications, in accordance with one or more embodiments, are not limited to providing a particular functionality. For example, the software application may provide one or more functionalities in the domains of word processing, accounting, tax preparation, record keeping, multimedia, gaming, etc. Accordingly, the back-end may include or provide access to databases, processing capabilities, etc., as needed by the software application.

In one or more embodiments, the application back-end (140) receives a user input provided by the user via the input interface (122) and generates a clickstream (146) from the user input. Broadly speaking, the clickstream (146) may be generated by the application back-end (140) as the user is navigating through the software application. The clickstream (146) may document any type of interaction of the user with the software application. For example, the clickstream (146) may include a history of page clicks and/or text inputs performed by the user to track the user's interaction with the software application. A user activity may, thus, be documented by storing an identifier for the user activity in the clickstream. In combination, user activity gathered over time may establish a context that may help identify a problem that the user is experiencing. The level of detail of user activity documented in the clickstream may vary. While in some scenarios, the clickstream may document all or almost all user activity, in other scenarios, not all user activities may be documented. For example, privacy requirements may exclude text typed by the user or other sensitive data from the clickstream. Further, the granularity of the clickstream may vary. In some scenarios, each user activity may be documented, whereas in other scenarios, only summaries of user activities may be documented. For example, counts of clicks may be stored in the clickstream rather than the individual clicks. In some embodiments, page or screen identifiers (IDs) for pages or screens that the user has accessed may be documented in the clickstream. Additional information may be included. For example, the time spent on a particular screen or page, interactions of the software application with third party components (such as when importing or downloading (successfully or unsuccessfully) external data such as bank account information, forms, etc.), may be included as well.

The clickstream (146) may be processed, for example, by performing a statistical analysis of the clickstream. The statistical analysis may provide insights into the user's behavior and/or interest. For example, a high number of repetitive clicks and/or significant time spent on a particular page may imply that the user is experiencing difficulties on this page. The clickstream (146) may, thus, provide context for the identification of the user's problem. The obtaining of the clickstream is described below with reference to the flowchart of FIG. 4.

In one or more embodiments, the application back-end obtains user attributes (148). User attributes may include, but are not limited to, user demographics including income, age, education, location, etc., and/or the software application(s) being accessed by the user, the version of the software application, extensions and/or plugins, linked accounts, components or other resources, etc. User attributes may be obtained from a database that includes user information.

The support service (150), in accordance with one or more embodiments of the disclosure, is a module configured to generate the problem summary (162). The support service (150) may establish or may obtain an interaction between a user and a support agent (152). For example, the support service (150) may gather exchanges between the user and the support agent, when addressing a problem experienced by the user. The exchanges may be text, e.g., when the user and the support agent interact in a chat session or by email. Alternatively, the exchanges between the user and the support agent may be spoken language. Speech-to-text operations may be performed to obtain a text representation. Interactions between users and support agents (152) may vary in complexity. For example, an interaction may be a simple question asked by the user, but an interaction may also include clarification questions by the support agent, followed by additional information provided by the user, etc.

The problem decoder (160) includes a set of machine-readable instructions (stored on a computer-readable medium) which when executed enable the problem decoder to generate the problem summary (162) based on the interaction between the user and the support agent (152), the clickstream (146), and optionally the user attributes (148). A description of the problem decoder (160) is provided below with reference to FIG. 2. Further, the flowcharts of FIG. 4, FIG. 5, FIG. 6, and FIG. 7 describe methods performed by the problem decoder.

Continuing with the discussion of the system (100), shown in FIG. 1, the network (190) communicatively connects the user computing system(s) (110), the user support computing system (130), and the support agent (198). The network (190) may include any combination of wired and/or wireless segments which may include the Internet. The communications between the user computing system(s) (110) and the user support computing system (130) may include any combination of secured and non-secured communications.

While FIG. 1 shows a configuration of components, other configurations may be used without departing from the scope of the disclosure. For example, various components (such as the front-end and the back-end of the software application) may be combined to create a single component. As another example, the functionality performed by a single component may be performed by two or more components that may be communicatively connected using a network connection. For example, the support service (150) and the application back-end (140) may be hosted on separate computing systems.

Figure 2:
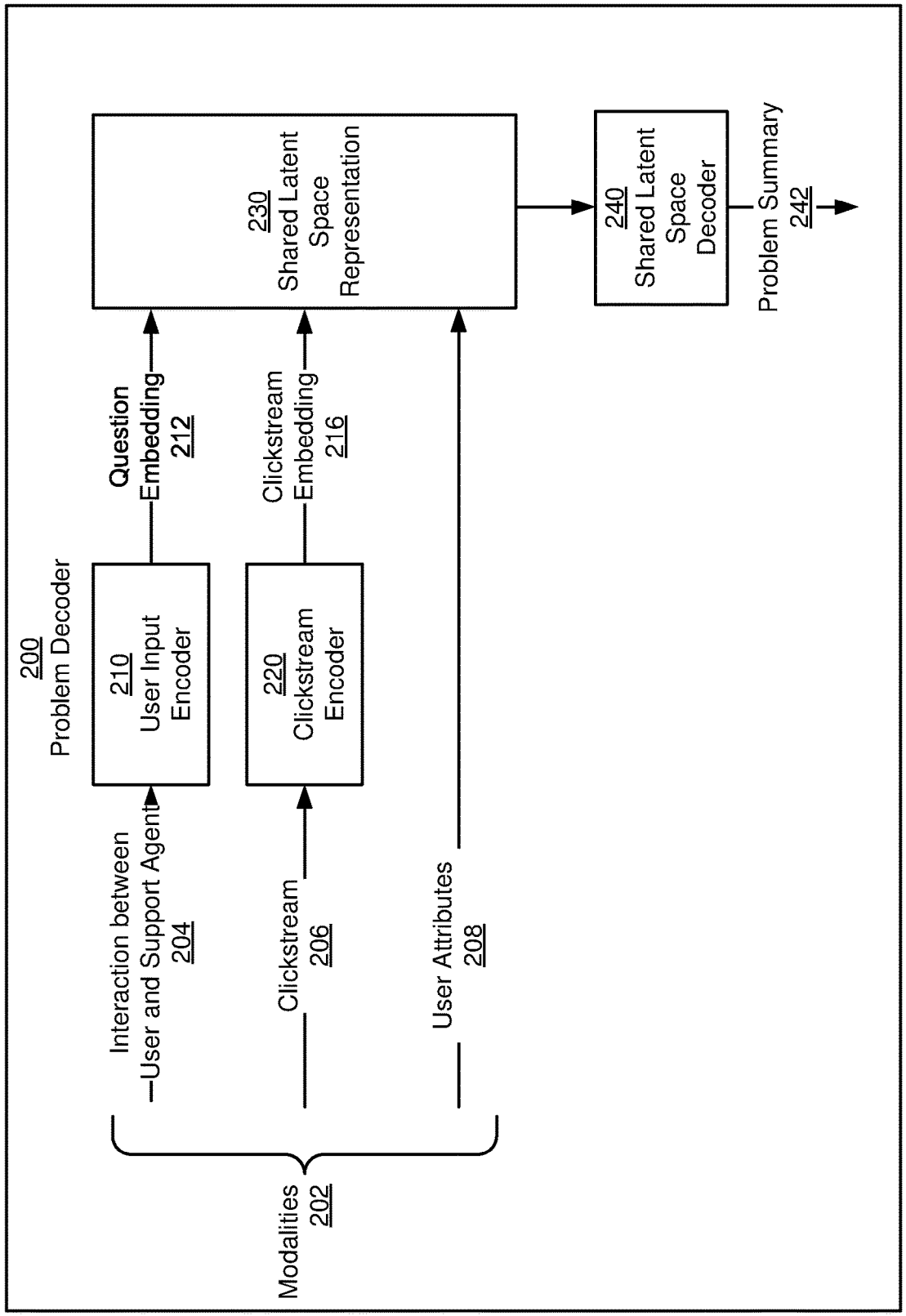
FIG. 2 shows a problem decoder in accordance with one or more embodiments of the disclosure.
Figure 7:
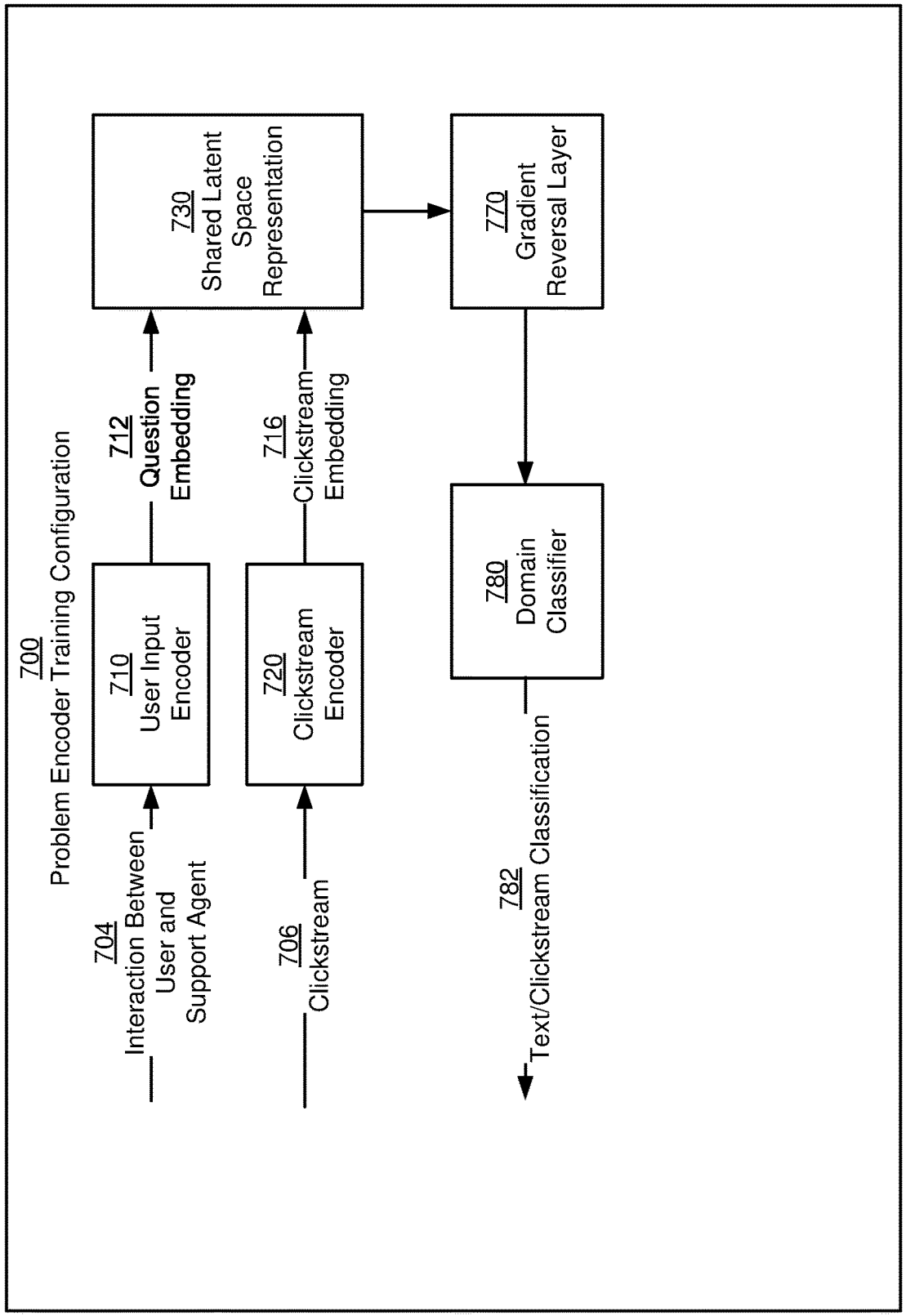
FIG. 7 shows a problem encoder training configuration in accordance with one or more embodiments of the disclosure.

Turning to FIG. 2, a problem decoder (200), in accordance with one or more embodiments, is shown. The problem decoder (200) includes a user input encoder (210), a clickstream encoder (220), a shared latent space representation (230), and a shared latent space decoder (240). In combination, these components may output a problem summary (242) from the modalities (202), provided as inputs. The modalities may include the interaction (204) between the user and the support agent, the clickstream (206), and optionally user attributes (208). Other additional components, for example, as shown in FIG. 7, may exist and may be used to update components of the problem decoder (200) using a reinforcement learning paradigm.

The user input encoder (210), in one or more embodiments, processes the interaction (204) between the user and the support agent to output a question embedding (212). The question embedding (212) may be in a vector space that is shared with the clickstream embedding (216) produced by the clickstream encoder (220) to form the shared latent space representation (230). The user input encoder (210) is described in more detail in FIG. 3. Further, the operations performed by the user input encoder (210) are described in the flowcharts of FIG. 4, FIG. 5, and FIG. 6.

The clickstream encoder (220), in one or more embodiments, processes the clickstream (206) to output the clickstream embedding (216). Various algorithms may be used to obtain the clickstream embedding (216) from the clickstream (206). In one or more embodiments, a deep learning-type algorithm is used. The algorithm may be, for example, a convolutional neural network (CNN). The CNN may include convolutional layers, pooling layers and fully connected layers. The CNN may accept the elements of the clickstream as input, and may provide a classification of the clickstream, based on a training or updating of the CNN. This training may have been performed using reinforcement learning, as discussed in detail with reference to FIG. 7. In one embodiment, a recurrent neural network (RNN) may be used. The RNN accepts, at the input, a sequence of vectors encoding the elements of the clickstream to produce a sequence of vectors representing hidden layer outputs. These hidden layer output vectors may subsequently be processed by an output layer which may implement, for example, a softmax function. In one or more embodiments, a Long Short-Term Memory (LSTM) type RNN is used, as discussed in detail below.

The shared latent space representation (230), in accordance with one or more embodiments, represents the problem summary (242) in a single, shared vector space. The question embedding (212), reflecting input provided by the user when asking for help, may directly contribute to the problem summary encoded in the shared latent space representation (230). Based on the approach used for training and updating the clickstream encoder (220) (discussed below with reference to FIGS. 6 and 7), the clickstream may contribute to refining the problem summary encoded in the shared latent space representation (230). The shared latent space representation forces the clickstream into a vector representation in a space similar to that used to represent the question embedding. More specifically, the clickstream encoder (220), during training/updating is "forced" to provide a clickstream embedding in the shared latent space representation as dictated by the question embedding (212). Because, during the training/updating of the clickstream encoder (220), the user input encoder (210) is not allowed to update, the question embedding (212) generated by the user input encoder (210) is forced upon the clickstream encoder (220). As a result, the clickstream encoder (220) begins to produce clickstream embeddings (216) in the shared latent space representation (230), thereby also contributing to the problem summary encoded in the shared latent space representation (230). The training of the clickstream encoder (220) to provide clickstream embeddings in the shared latent space representation (230) is performed using an adversarial domain classification framework, including a gradient reversal layer, as described in detail below with reference to Step 602 of FIG. 6, and with reference to FIG. 7.

The shared latent space decoder (240), in one or more embodiments, operates on the shared latent space representation (230) to produce the problem summary (242). The problem summary may be a human-readable text, for example, a question summarizing the user's problem based on the information that was obtained from the interactions between the user and the support agent (204), the clickstream (206), and optionally the user attributes (208). The shared latent space decoder (240) may be an artificial neural network such as a long short-term memory (LSTM) model, discussed in detail below. Various hyperparameters may be used to tune the LSTM model for a given dataset. The hyperparameters may include, but are not limited to, the number of layers and the dimensionality of the hidden state.

Figure 3:
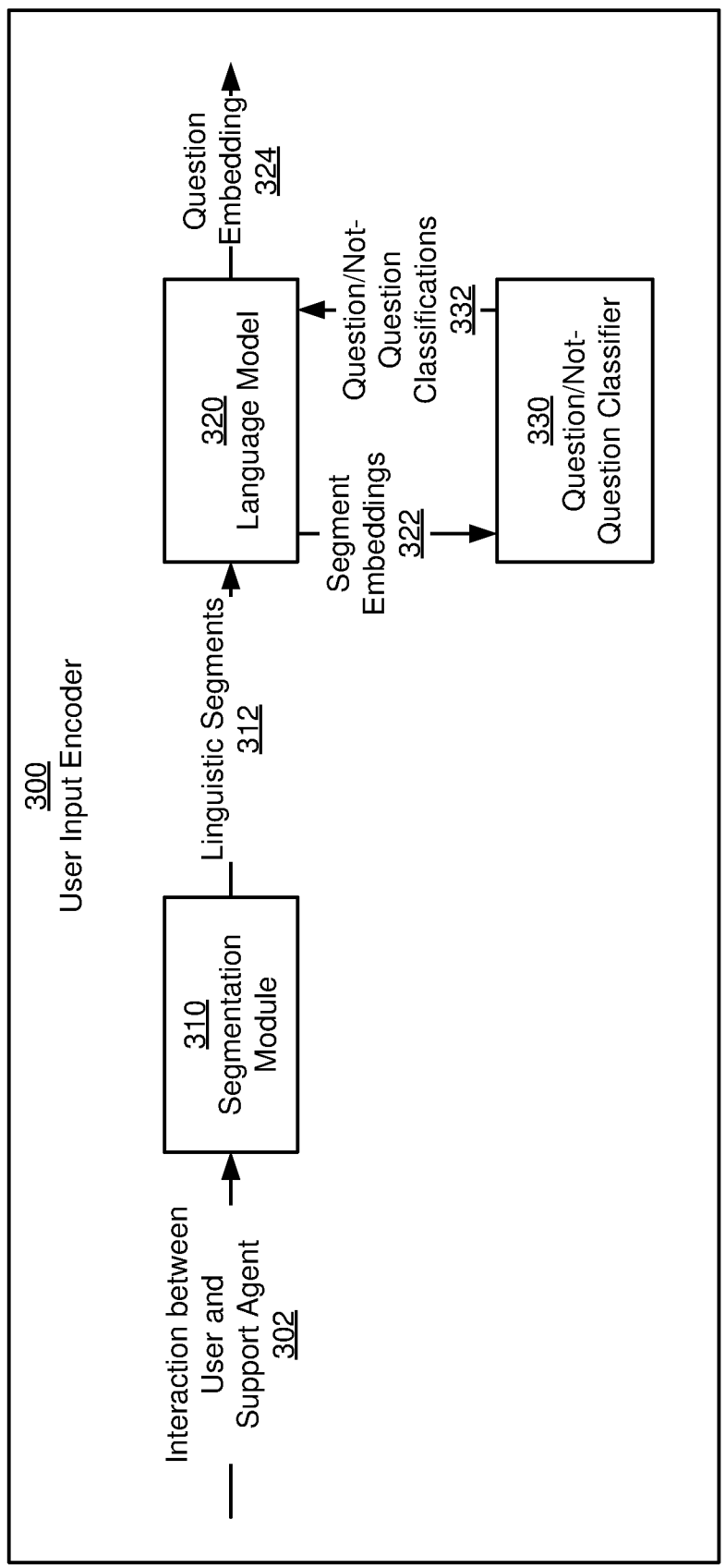
FIG. 3 shows a user input encoder in accordance with one or more embodiments of the disclosure.

Turning to FIG. 3, a user input encoder (300), in accordance with one or more embodiments, is shown. As discussed with reference to FIG. 2, the user input encoder (300), in one or more embodiments, processes the interaction (302) between the user and the support agent to output a question embedding (324). The user input encoder (300) includes a segmentation module (310), a language model (320), and a question/not-question classifier (330), as subsequently described.

The segmentation module (310) operates on the interaction between the user and the support agent (302) to output linguistic segments (312) such as sentences, or alternatively other linguistic segments such as phrases, paragraphs, etc. Various methods may be used. These methods may depend on the format in which the interaction (302) between the user and the support agent is obtained. For example, the operations performed for the segmentation may be different depending on whether the interaction (302) between the user and the support agent is text or speech. A description of the operations performed by the segmentation module (310) is provided below in Step 500 of FIG. 5.

The language model (320) operates on the linguistic segments (312) to generate a question embedding (324). In one or more embodiments, the language model operates on those linguistic segments that are assumed to reflect the user's problem, while ignoring other linguistic segments. For example, in a scenario that involves linguistic segments including statements made by the user and other linguistic segments including statements made by the support agent, only the linguistic segments that include statements by the user are considered. Different types of algorithms may be used for the language model. For example, the Bidirectional Encoder Representations from Transformers (BERT) framework by Google AI language may be used. The output is the question embedding (324) in a high-dimensional vector space. The operations performed by the language model (320) are described in Step 504 of FIG. 5.

The question/not-question classifier (330) operates on segment embeddings (322), produced by the language model (320) from the linguistic segments (312) to classify each of the linguistic segments (312) as either a question or not a question. A question/not-question classification (332) is returned to the language model (320) for each of the linguistic segments (312). The question/not-question classifier (330) may be any type of binary classifier. In one embodiment, a neural network implementing a logistic regression is used. The operations performed by the question/not-question classifier (330) are described in Step 502 of FIG. 5.

In one or more embodiments, various components of the user input encoder (300) require initial training and/or benefit from updating while the input encoder is used. A description of the training is provided in Step 600 of FIG. 6.

Figure 4:
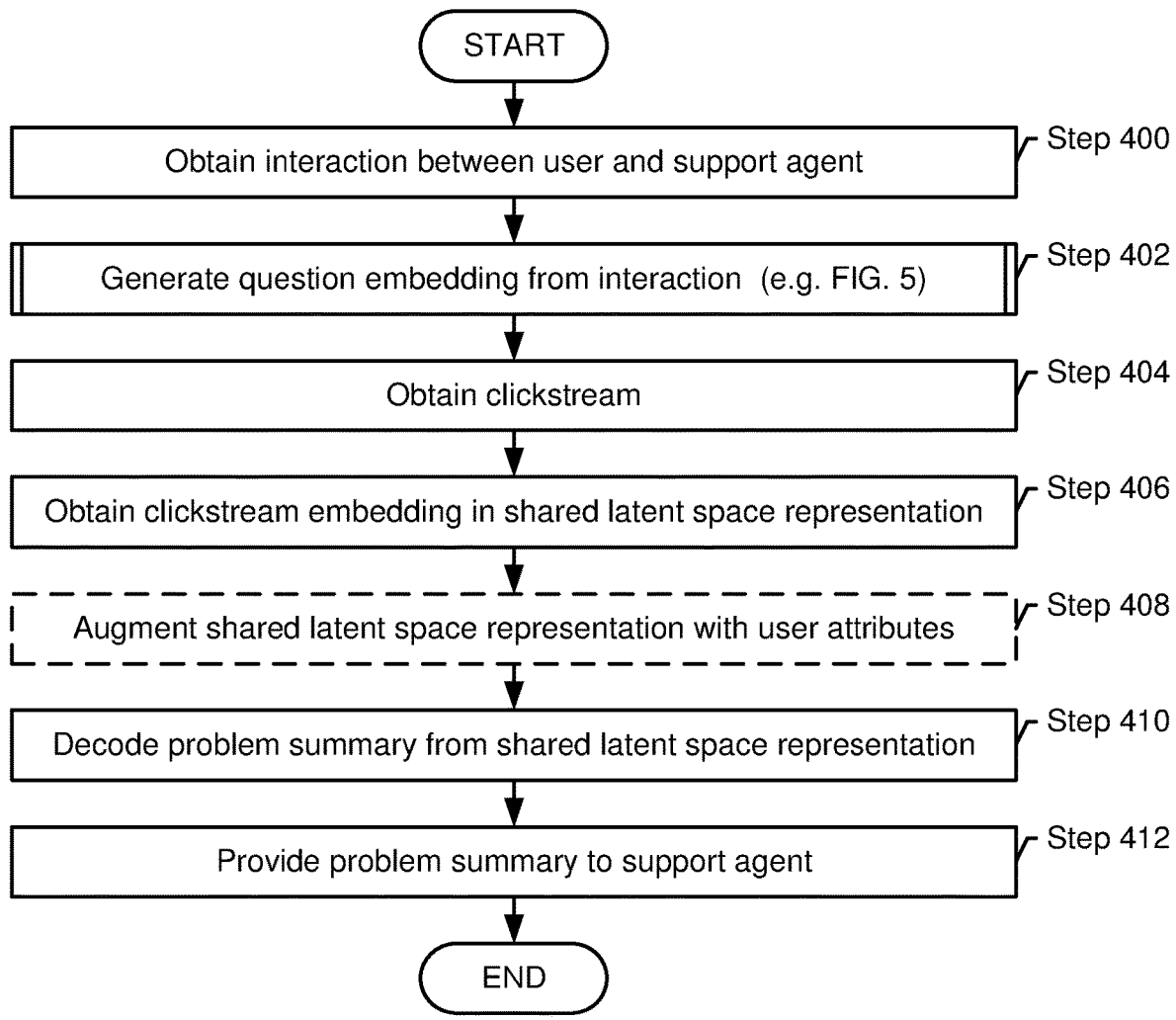
FIG. 4 shows a flowchart describing a method for decoding a problem from multimodal information in accordance with one or more embodiments of the disclosure.

Turning to FIG. 4 a flowchart in accordance with one or more embodiments of the disclosure is shown. While the various steps in this flowchart are provided and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the disclosure. By way of an example, determination steps may not require a processor to process an instruction unless an interrupt is received to signify that condition exists in accordance with one or more embodiments of the disclosure. As another example, determination steps may be performed by performing a test, such as checking a data value to test whether the value is consistent with the tested condition in accordance with one or more embodiments of the disclosure.

The flowchart of FIG. 4 describes a method for decoding a problem that the user is experiencing from multimodal information in accordance with one or more embodiments of the disclosure. The method relies on multimodal input (including an interaction between a user and a support agent, a clickstream, and optionally user attributes) to provide a problem summary. The method may be executed whenever an interaction between the user and the support agent becomes available. The method may be re-executed as the interaction continues. For example, the method may be initially executed when the user asks a question or reports a problem. The method may be re-executed when the user provides additional details, e.g., in response to the support agent asking for clarification. With a more comprehensive interaction between the user and the support agent becoming available over time, the problem summary that is generated by the method may become increasingly detailed and/or accurate by more closely reflecting the actual problem that the user is experiencing. Additional methods may be executed in conjunction with the method of FIG. 4. For example, to update machine learning-based components used in the method of FIG. 4, the steps described in FIG. 6 may be executed, as discussed below.

In Step 400, an interaction between the user and the support agent is obtained. The interaction may be obtained in various formats. For example, the interaction may be a chat protocol, an audio recording of a phone call, an email exchange, etc.

In Step 402, a question embedding is generated from the interaction. The question embedding is assumed to encode a problem description, based on information provided by the user during the interaction, in a high-dimensional vector space. The details are provided in FIG. 5.

In Step 404, a clickstream is obtained. The clickstream may be obtained as the user is interacting with the software application. The clickstream may be captured by an application front-end or application back-end of the software application when the user is interacting with the software application, for example, by navigating pages of the software application, making selections, entering information, etc. As previously discussed, the gathered clickstream may form the context to be used in subsequent steps to determine a problem summary.

In one embodiment, a series of screen IDs are collected as the clickstream when the user navigates through the software application, thereby accessing a series of screens or pages of the software application. The following example is based on four screens of a tax software application being sequentially accessed. The screen IDs are stored in the array with screen IDs such as ["incomeexplore", "s1040perbfdi8858", "2017deductionscredits", "deductionsguideme"]. The array may have a set size and may be limited to, for example, the 4, 5, or 20 most recent screen IDs. "Null" values may be entered initially, before the user begins accessing the software application, and these null values may be replaced by actual screen IDs as the user is accessing screens of the software application. The collected screen IDs forming the clickstream are categorical variables and may, thus, directly serve as the input to the query decoder (150). Alternatively, the screen IDs may be transformed into another representation using any kind of alphanumerical encoding to identify the screens that were accessed by the user.

The clickstream may further include other data, including initially non-categorical data, such as numbers entered by the user. The noncategorical data may need to be converted to categorical variables to allow treatment analogous to screen IDs. Consider the example of a tax preparation software application. In the tax preparation software application, many entries are numbers (i.e., numeric entries). For example, a user may provide a value for income, taxes withheld, etc. To convert the numeric entries to categorical variables, the numbers may be arranged in a set number of classes or groups. Consider the example of the income "$58,900" received as a number. Historically observed incomes may have been used to establish the following income groups: Income Group 1: $0 . . . $9,999; Income Group 2: $10,000 . . . $19,999; Income Group 3: $20,000 . . . $49,999; Income Group 4: $50,000 . . . $199,999; Income Group 5: $200,000+. Accordingly, the received income would be assigned to Income Group 4, to obtain a categorical variable "income_group_4". Once the initially non-categorical data is converted to categorical data, it may be treated similar to other clickstream data such as page IDs.

In one or more embodiments, the clickstream also includes measurements of time spent on the pages identified by the page IDs. The measurement may be obtained based on time stamps that are recorded as the user is interacting with the software application. The measurements of time may then be converted into categorical data, as described in the previous paragraph. Alternatively, flags may be used to indicate that the user spent substantially more or substantially less time than typical (e.g. average) on the pages.

The clickstream may capture the most recent interactions of the user with the software applications up until the point in time when the user submits the support request, marking the beginning of the interaction described in Step 400.

In Step 406, the clickstream embedding is obtained based on the clickstream. In one or more embodiments, the clickstream embedding is a high-dimensional vector representation of the clickstream. Further, in one or more embodiments, the clickstream embedding is in a shared latent space representation together with the question embedding. The methods used to achieve the shared latent space representation are described below in FIG. 6.

The individual entries in the clickstream are categorical variables such as screen IDs and may, thus, be treated analogous to text (letter, tokens, words, etc.). Consider the previously introduced example of the clickstream ["incomeexplore", "s1040perbfdi8858", "2017 deductionscredits", "deductionsguideme"] where the screen IDs form a sequence of categorical variables. These screen IDs or other elements of the clickstream may be processed using, for example, an artificial neural network to generate a clickstream embedding. Historically observed sequences of screen IDs obtained from click streams gathered over time may form the corpus used for training the artificial neural network.

In one or more embodiments, the artificial neural network is based on a deep learning-type algorithm. The algorithm may be, for example, a convolutional neural network (CNN). The CNN may include convolutional layers, pooling layers and fully connected layers. The CNN may accept the screen IDs or other elements of the clickstream as input, and may provide a classification of the clickstream, based on a previously performed training of the CNN. This training may have been performed using backpropagation by evaluating a loss function to obtain gradients for updating weights of the CNN. A supervised corpus may be used for the training. The corpus may include samples consisting of historically collected clickstreams. Alternatively, as further discussed below in FIG. 6, reinforcement learning may be used for training and updating.

To consider the sequence (or order) of the elements in the clickstream, a recurrent neural network (RNN) may be used. The RNN accepts, at the input, a sequence of vectors encoding the clickstream to produce a sequence of vectors representing hidden layer outputs. These hidden layer output vectors may subsequently be processed by an output layer which may implement, for example, a softmax function.

An LSTM recurrent neural network may be used to evaluate the sequence of vectors representing the elements of the clickstream. In one or more embodiments of the disclosure, a bidirectional LSTM (Bi-LSTM) is used. The LSTM may evaluate the sequence of vectors representing the elements of the clickstream in both directions.

The following implementation may be used:

$$i_t = \sigma(W_{xi}x_t + W_{hi}h_{t-1} + W_{ci}c_{t-1} + b_i),$$

$$c_t = (1-i_t) \odot c_{t-1} + i_t \tanh(W_{xc}x_t + W_{hc}h_{t-1} + b_c),$$

$$o_t = \sigma(W_{ox}x_t + W_{ho}h_{t-1} + W_{co}c_t + b_o),$$

$$h_t = o_t \odot \tanh(c_t) \quad (1)$$

where $\sigma$ is the element-wise sigmoid function, and $\odot$ is the element-wise product. For a given clickstream $(x_1, x_2, \ldots$ $x_n$) containing n clickstream entries, each represented by a vector, the LSTM computes a representation $\overrightarrow{h_t}$ of the left context of the clickstream at every character t. Generating a representation of the right context $\overleftarrow{h_t}$ may add useful information. Accordingly, a second LSTM that reads the same sequence in reverse may be added. A forward LSTM and a backward LSTM may thus be performed by two distinct networks, thereby obtaining the Bi-LSTM. The representation of a clickstream element using this model may be obtained by concatenating left and right context representations, $\overrightarrow{h_t} = \overleftarrow{h_t}$.

A softmax function or any other type activation function may subsequently be used to obtain an output in the format of a vector representing the clickstream as a clickstream embedding.

Backpropagation may be used to train the above implementation of the LSTM, specifically the weight matrices, based on an appropriately selected corpus that includes clickstream data collected over time.

Other implementations may be used without departing from the disclosure. For example, topic modeling approaches such as the Continuous Bag of Words (CBOW), operating on screen IDs instead of words, may be used.

In Step 408, the shared latent space representation is augmented with user attributes. User attributes may be obtained from a database that includes user information such as a user account or a user profile. User attributes that are added to the shared latent space representation may include user demographics including income, age, education, etc., the software application(s) being accessed by the user, and/or any other information that may help identify the user's problem. The user attributes may be added to the shared latent space representation using a vector concatenation operation. The augmentation of the shared latent space representation with user attributes is optional.

In Step 410, the problem summary is decoded from the shared latent space representation. The decoding may be performed by an LSTM, similar to the previously introduced LSTM, trained or updated as described in Step 604 of FIG. 6, to obtain a problem summary that is human-readable text, for example, a question summarizing the user's problem. The decoding is based on a supervised learning approach that uses historical data (e.g., the previously experienced and documented support calls). The shared latent space representation leverages the additional information that becomes available through the clickstream. As a result, the decoding result may be considerably better than what would be achievable by decoding from the question alone. An example technique for decoding using LSTM is described in U.S. patent application Ser. No. 15/994,898, which is incorporated herein by reference.

In Step 412, the problem summary is provided to the support agent. The problem summary may also be included in a case documentation generated for the interaction between the user and the support agent.

Additional steps may follow. For example, in a subsequent step, a real-time search may be conducted to identify a similar user problem. More specifically, the decoded question may be matched to a most similar case that has been solved in the past. The matching may be performed, for example, using cosine similarity or cosine distance applied to the shared latent space representation. The answer associated with the most similar case may be provided. Alternatively, a set of highest ranked answers may be provided, ordered based on proximity.

Figure 5:
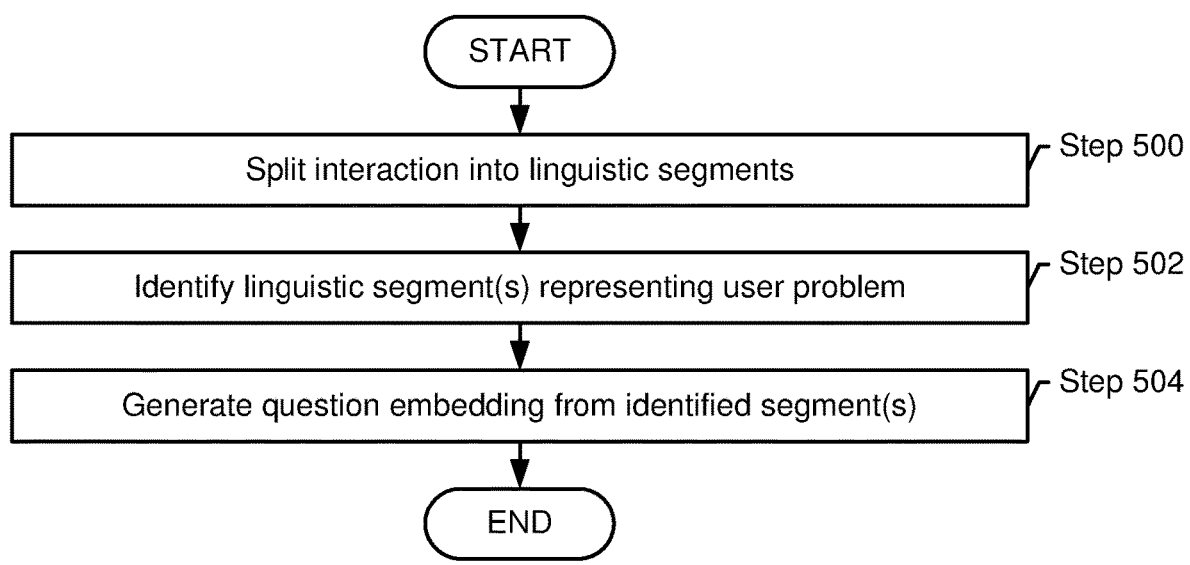
FIG. 5 shows a flowchart describing a method for generating a question embedding from an interaction between a user and a support service.

Turning to FIG. 5, a method for generating a question embedding from the interaction between the user and the support agent is shown.

In Step 500, the interaction is split into linguistic segments such as, for example, sentences. The splitting may be performed to facilitate the distinction of linguistic segments representing the user problem from linguistic segments representing other aspects, such as a response by the support agent. The splitting into linguistic segments may be performed using, for example, a detection of sentence boundaries, paragraphs, email headers and/or other cues.

If the interaction involves spoken language, a speech-to-text conversion may be performed prior to obtaining the linguistic segments. The analysis of the interaction may benefit from additional information that may be extracted from an audio recording of the spoken language. For example, separate audio channels may be used for recording the user and the support agent, thus allowing immediate separation of sentences spoken by the user from sentences spoken by the support agent. Similarly, voices may be clearly distinguishable, thereby enabling the separation.

In Step 502, the linguistic segments that represent the user problem are identified. Additionally, other classes of linguistic segments may also be identified. For example, linguistic segments that include a verification of the user problem by the support agent, linguistic segments that include a proposal of solution or action by the support agent, and/or linguistic segments that include a user validation of the support agent's proposed solution or action may be identified. The detection may be repeatedly performed during the ongoing interaction between the user and the support agent.

To perform the identification, in one or more embodiments, a linguistic segment is first processed by a language model, such as the Bidirectional Encoder Representations from Transformers (BERT) language model. The output is a segment embedding. The segment embedding may then be processed by a binary classifier to determine whether the linguistic segment being processed is related to the user problem (i.e., representing a question by the user), or not related to the user problem (i.e., not representing a question by the user). The question/not-question classifier may return a question/not-question classification. Any type of classifier, e.g., a logistic regression, may be used. The question/not-question classifier may separately perform the classification for all linguistic segments to obtain question/not-question classifications for all the linguistic segments.

The question/not-question classification may be facilitated by eliminating certain linguistic segments from consideration. For example, only linguistic segments that are associated with the user may be considered for classification as a question, whereas linguistic segments that are associated with the support agent may be automatically classified as a non-question. If all linguistic segments originating from the user are assumed to be representing the user problem, the use of the question/not-question classifier may be unnecessary.

In Step 504, once all linguistic segments have been classified as either question or not-question, all linguistic segments that have been classified as a question may be concatenated. The concatenated linguistic segments may be processed by the language model to produce the question embedding. The question embedding, thus, may reflect the combined information of all linguistic segments that are assumed to represent the user problem. Alternatively, only the linguistic segment classified as a question with a highest confidence value may be processed.

Figure 6:
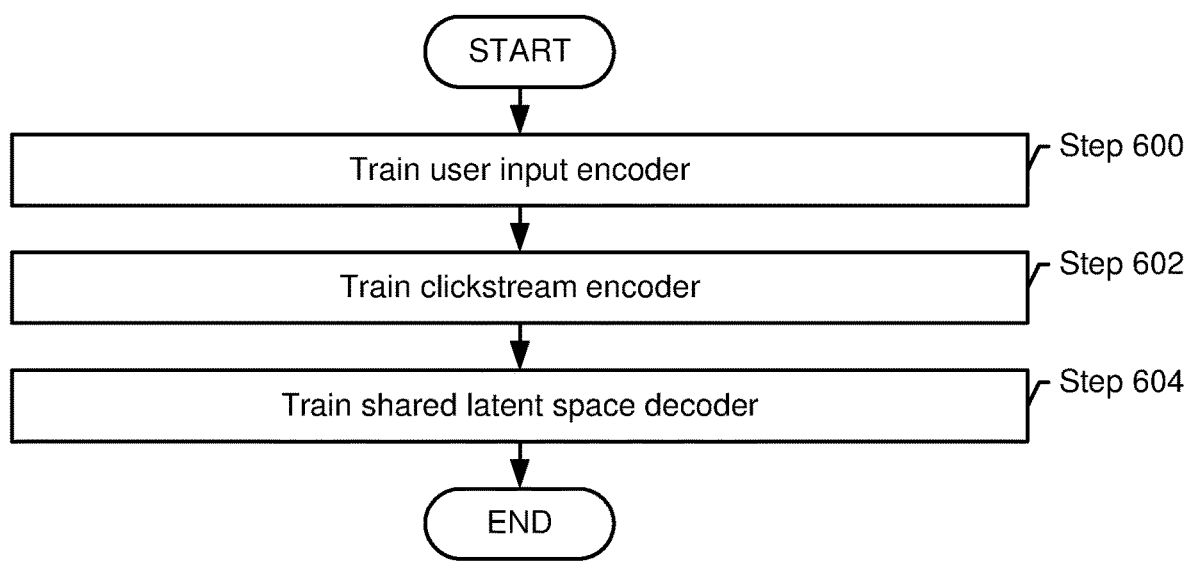
FIG. 6 shows a flowchart describing a method for training various components of the system for facilitating user support using multimodal information in accordance with one or more embodiments of the disclosure.

FIG. 6 discusses methods for training various machine learning-based components of the system. Embodiments of the disclosure employ generative models that are based on adversarial training to produce a problem summary, and subsequently to identify a suggested solution. The models "translate" from the clickstream obtained from a user and interactions between the user and a support agent. Some of the training may be performed as an updating after one or more executions of the method of FIG. 4 once feedback from the user and/or the support agent becomes available to guide the training, as discussed below.

Throughout the previous discussion, the various machine learning-based models were assumed to be trained in order to perform their function. The training may have been performed prior to the initial execution of the described methods. In one or more embodiments, an updating is performed as the methods are used. The subsequently discussed Steps 600, 602, and 604 introduce learning as it may be used for different machine learning-based components of the system. While these steps are shown in sequential order, those skilled in the art will appreciate that at least some of these steps may be independently executed, in any order, at any time, and at any frequency.

In Step 600, the user input encoder is trained. As previously discussed with reference to FIG. 3, the user input encoder includes a segmentation module, a language module, and a question/not-question classifier. The language model may be a Bidirectional Encoder Representations from Transformers (BERT), and may be assumed to have been pre-trained. Accordingly, at the time when Step 600 is executed, the language model is already capable of producing question embeddings from linguistic segments. The question/not-question classifier may be trained to perform the classification using a backpropagation approach based on labeled data that is available at the time of training. The labeled data may be based on prior interactions between the user and the support agent, and may have been annotated by the support agent to label linguistic segments that are questions or problem descriptions by the user. Alternate methods for obtaining labels may be used without departing from the disclosure. Additional labeled data may be obtained throughout the execution of the method of FIG. 4, when feedback from the support agent and/or the user is used to label linguistic segments. For example, the support agent may directly perform the labeling while interacting with the user. The additional labeled data that becomes available over time may be used to update the question/not question classifier using a reinforcement learning approach. Shifts in the language used in the interaction between user and support agent over time may, thus, be accommodated by having the question/not-question classifier follow these shifts.

In Step 602, the clickstream encoder is trained. As previously discussed, the clickstream encoder may be based on a long short-term memory (LSTM) model. The clickstream encoder, in one or more embodiments, is trained using an adversarial domain classification framework, including a gradient reversal layer, as subsequently described with reference to FIG. 7.

FIG. 7 shows a problem encoder training configuration (700), in accordance with one or more embodiments. The fundamental configuration of the user input encoder (710) and the clickstream encoder (720) generating the shared latent space representation (730) is similar to the previously described configuration shown in FIG. 2. However, unlike in FIG. 2, in the configuration of FIG. 7, the shared latent space representation (730) is processed by a gradient reversal layer (770) and then provided to the domain classifier to output a text or clickstream classification (782). The gradient reversal layer (770) in one or more embodiments, during forward operation, passes the input (e.g., the question embedding (712) and/or the clickstream embedding (716) of the shared latent space representation (730)) without further processing. Accordingly, the question embedding (712) and/or the clickstream embedding (716) reach the domain classifier (780) without being modified. However, during backpropagation, when the gradient propagates in the reverse direction, the sign of the gradient is reversed. Accordingly, based on the forward operation of the gradient reversal layer (770), the domain classifier (780) attempts to correctly predict domains as either text or clickstream. Due to the reversed sign of the gradient during backpropagation, the domain classifier is "fooled", though. Rather than causing a clear distinction between the two domains (question embedding (712) and clickstream embedding (716)), the two domains become less and less distinguishable (and ideally indistinguishable) during the training. As a result, during the training using the backpropagation approach, the artificial neural networks are updated (as subsequently described) until the text predictions and clickstream predictions match or approximate the inputs provided to the user input encoder and the clickstream encoder, i.e., the interaction (704) and the clickstream (706). In other words, the domain classification loss is maximized rather than minimized. To achieve the shared latent space representation (730) (thereby maximizing the domain classification loss), the clickstream encoder (720) is to be trained to produce clickstream embeddings (716) that are ideally indistinguishable from the question embeddings (712) (thereby forming the shared latent space representation), while the user input encoder (710) is frozen. In other words, the user input encoder (710) is prevented from updating, whereas the clickstream encoder (720) is forced to update in order to adjust the outputted clickstream embeddings (716) until they form the shared latent space representation (730) when combined with the question embeddings (712). The domain classifier (780) may be trained along with the clickstream encoder (720) using an end-to-end training approach. The number of hidden layers and the number of neurons in each layer may be hyperparameters. Random weights may be used for initialization.

While the domain classifier (780) would normally minimize a domain classification loss (the clickstream vs the text representing the user problem), during backpropagation the gradient reversal layer reverses the sign of loss, thus driving the clickstream encoder to maximize the domain classification loss. This is accomplished by the clickstream encoder (720) starting to produce clickstream embeddings (716) in a vector space that is increasingly similar to the vector space of the question embedding.

Continuing with the discussion of FIG. 6, in Step 604, the shared latent space decoder is trained. In one or more embodiments, the shared latent space decoder is an LSTM network. The training may be performed in a supervised manner, using an existing labeled data set which may be based on problem resolutions in the past.

Various steps described in FIG. 6 require feedback, e.g., when performing reinforcement learning. To obtain at least some of the necessary data, feedback is obtained during or after the interaction between the user and the support agent. Various forms of explicit feedback may be obtained. For example, during an ongoing interaction the support agent may verify whether a question/no-question classification is correct. Further, speech analytics capable of querying for specific terms (for example, queries matches for "Thank you for calling Intuit" and "You will receive a survey about my performance" may be used to isolate speech segments related to verbal feedback on various aspects such as agent performance). In addition, the sentiment of calls, emails, or chats may be analyzed to obtain an implicit feedback based on the detected emotions of the user.

Various embodiments of the disclosure have one or more of the following advantages. Embodiments of the disclosure track a user behavior (using a clickstream) and obtain an initial user input (the user asking a question or describing a problem during an interaction between the user and a support agent) to predict a summary of the user's problem. By understanding and deep learning from the user clickstream, the interactions between the user and the support agent, and optionally the user attributes, embodiments of the disclosure infer a problem summary more precisely and faster and empower the support agent to recommend the right answer based on automatically generated problem and answer summaries.

The support agent may be able to gain a better understanding of the user's actual problem while spending less time on interacting with the user, thereby improving the quality of the provided support, while simultaneously reducing support cost as a result of the expedited interaction between the user and the support agent. Even when a user has very limited knowledge and may struggle with articulating the problem, embodiments of the disclosure assist the support agent in providing support to the user.

Further, based on the summery of the user's problem, a relevant answer may be obtained and provided to the support agent while the support agent is interacting with the user. With a large volume of previously solved cases, the likeliness of a newly received support request being similar to a previously processed support request increases. Accordingly, embodiments of the disclosure may learn to provide accurate answers, based on previously handled interactions between users and support agents. The recommendation provided by the support agent may thus be better informed, based on relevant answers being proposed by embodiments of the disclosure.

Embodiments of the disclosure may be implemented on a computing system. Any combination of mobile, desktop, server, router, switch, embedded device, or other types of hardware may be used. For example, as shown in FIG. 8A, the computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), and numerous other elements and functionalities.

The computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device.

The communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 8A:
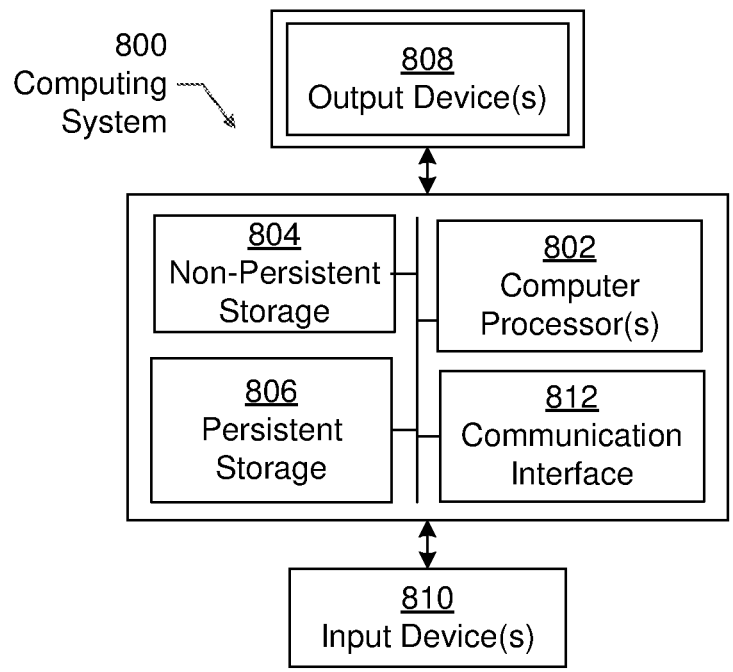
FIG. 8A and FIG. 8B show computing systems in accordance with one or more embodiments of the disclosure.

The computing system (800) in FIG. 8A may be connected to or be a part of a network. For example, as shown in FIG. 8B, the network (820) may include multiple nodes (e.g., node X (822), node Y (824)). Each node may correspond to a computing system, such as the computing system shown in FIG. 8A, or a group of nodes combined may correspond to the computing system shown in FIG. 8A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (800) may be located at a remote location and connected to the other elements over a network.

Figure 8B:
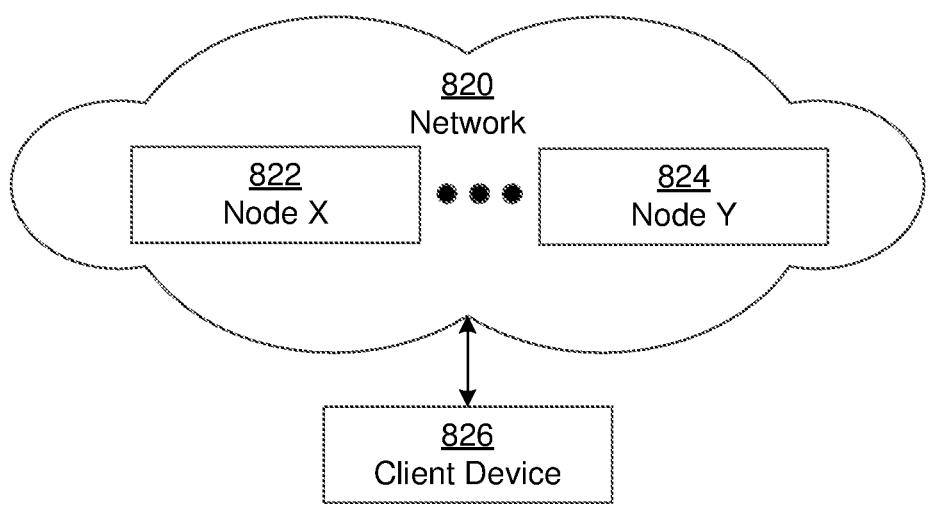

Although not shown in FIG. 8B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (822), node Y (824)) in the network (820) may be configured to provide services for a client device (826). For example, the nodes may be part of a cloud computing system. The nodes may include functionality to receive requests from the client device (826) and transmit responses to the client device (826). The client device (826) may be a computing system, such as the computing system shown in FIG. 8A. Further, the client device (826) may include and/or perform all or a portion of one or more embodiments of the disclosure.

The computing system or group of computing systems described in FIG. 8A and 8B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 8A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query provided to a structured data repository (where the data repository may be organized according to a database schema or data format, such as XML).

The extracted data may be used for further processing by the computing system. For example, the computing system of FIG. 8A, while performing one or more embodiments of the disclosure, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 8A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 8A may include functionality to provide raw and/or processed data, such as results of comparisons and other processing. For example, providing data may be accomplished through various presenting methods. Specifically, data may be provided through a user interface provided by a computing device. The user interface may include a GUI that displays information on a display device, such as a computer monitor or a touchscreen on a handheld computer device. The GUI may include various GUI widgets that organize what data is shown as well as how data is provided to a user. Furthermore, the GUI may provide data directly to the user, e.g., data provided as actual data values through text, or rendered by the computing device into a visual representation of the data, such as through visualizing a data model.

For example, a GUI may first obtain a notification from a software application requesting that a particular data object be provided within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be provided through various audio methods. In particular, data may be rendered into an audio format and provided as sound through one or more speakers operably connected to a computing device.

Data may also be provided to a user through haptic methods. For example, haptic methods may include vibrations or other physical signals generated by the computing system. For example, data may be provided to a user using a vibration generated by a handheld computer device with a predefined duration and intensity of the vibration to communicate the data.

The above description of functions presents only a few examples of functions performed by the computing system of FIG. 8A and the nodes and/or client device in FIG. 8B. Other functions may be performed using one or more embodiments of the disclosure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for facilitating user support using multimodal information, the method comprising:
    obtaining an interaction between a user and a support agent;
    generating a question embedding from the interaction;
    obtaining a clickstream associated with the interaction;
    generating a clickstream embedding from the clickstream, wherein the question embedding and the clickstream embedding form a shared latent space representation;
    decoding a problem summary from the shared latent space representation; and
    providing the problem summary to the support agent.

2. The method of claim 1, wherein generating the clickstream embedding from the clickstream comprises processing the clickstream by a Long Short-Term Memory (LSTM) type recurrent neural network (RNN).

3. The method of claim 2, further comprising:
    updating the RNN using reinforcement learning based on feedback from at least one of the user and the support agent.

4. The method of claim 3, wherein updating the RNN using reinforcement learning comprises driving the RNN to produce the clickstream embedding in a vector space that is increasingly similar to a vector space of the question embedding, thereby establishing the shared latent space representation.

5. The method of claim 3, wherein the updating the RNN to achieve the shared latent space representation comprises maximizing a domain classification loss, using a gradient reversal layer during a backpropagation operation.

6. The method of claim 1, further comprising:
performing a speech to text operation to obtain the interaction from a conversation between the user and the support agent,
wherein generating the question embedding is performed in real-time as the conversation progresses.

7. The method of claim 1, wherein generating the question embedding from the interaction comprises: splitting the interaction into a plurality of linguistic segments, from the plurality of linguistic segments, identifying at least one linguistic segment representing a user problem, and processing the at least one linguistic segment by a language model to obtain the question embedding.

8. The method of claim 7, wherein the language model comprises a Bidirectional Encoder Representations from Transformers (BERT) network.

9. The method of claim 7, wherein the plurality of linguistic segments further comprises at least one of: a linguistic segment representing a proposed action by the support agent, and a linguistic segment representing a validation of the proposed action by the user.

10. The method of claim 9, wherein identifying the at least one linguistic segment representing the user problem comprises applying a binary classifier configured to distinguish the linguistic segment representing the user problem from the linguistic segment representing the proposed action and the linguistic segment representing the validation of the proposed action.

11. The method of claim 1, further comprising, prior to decoding the problem summary from the shared latent space representation: augmenting the shared latent space representation with user attributes.

12. A system for facilitating user support using multimodal information, the system comprising:
a computer processor; and
a problem decoder executing on the computer processor configured to:
obtain an interaction between a user and a support agent;
generate, by a user input encoder, a question embedding from the interaction;
obtain a clickstream associated with the interaction;
generate, by a clickstream encoder, a clickstream embedding from the clickstream,
wherein the question embedding and the clickstream embedding form a shared latent space representation;
decode, by a shared latent space decoder, a problem summary from the shared latent space representation; and
provide the problem summary to the support agent.

13. The system of claim 12, wherein the clickstream encoder is configured to perform the generating the clickstream embedding from the clickstream by:
processing the clickstream by a Long Short-Term Memory (LSTM) type recurrent neural network (RNN) of the clickstream encoder.

14. The system of claim 13,
wherein the problem decoder further comprises a gradient reversal layer and a domain classifier, and
wherein an updating of the RNN using reinforcement learning comprises driving the RNN to produce the clickstream embedding in a vector space that is increasingly similar to a vector space of the question embedding, thereby establishing the shared latent space representation, using the domain classifier and the gradient reversal layer.

15. The system of claim 12, wherein the user input encoder comprises: a segmentation module configured to split the interaction into a plurality of linguistic segments, a binary classifier configured to identify, from the plurality of linguistic segments, at least one linguistic segment representing a user problem, and a language model configured to process the at least one linguistic segment to obtain the question embedding.

16. A non-transitory computer readable medium comprising computer readable program code for facilitating user support using multimodal information, the computer readable program code causing a computer system to:
obtain an interaction between a user and a support agent;
generate a question embedding from the interaction;
obtain a clickstream associated with the interaction;
generate a clickstream embedding from the clickstream,
wherein the question embedding and the clickstream embedding form a shared latent space representation;
decode a problem summary from the shared latent space representation; and
provide the problem summary to the support agent.

17. The non-transitory computer readable medium of claim 16, wherein generating the clickstream embedding from the clickstream comprises processing the clickstream by a Long Short-Term Memory (LSTM) type recurrent neural network (RNN).

18. The non-transitory computer readable medium of claim 17, wherein the computer readable program code further causes the computer system to:
update the RNN using reinforcement learning based on feedback from at least one of the user and the support agent, the updating comprising:
driving the RNN to produce the clickstream embedding in a vector space that is increasingly similar to a vector space of the question embedding, thereby establishing the shared latent space representation, and
wherein the updating the RNN to achieve the shared latent space representation comprises maximizing a domain classification loss, using a gradient reversal layer during a backpropagation operation.

19. The non-transitory computer readable medium of claim 16, wherein the computer readable program code further causes the computer system to:
perform a speech to text operation to obtain the interaction from a conversation between the user and the support agent,
wherein generating the question embedding is performed in real-time as the conversation progresses.

20. The non-transitory computer readable medium of claim 16, wherein generating the question embedding from the interaction comprises: splitting the interaction into a plurality of linguistic segments, from the plurality of linguistic segments, identifying at least one linguistic segment representing a user problem, and processing the at least one linguistic segment by a language model to obtain the question embedding.

* * * * *